No. 693,508. Patented Feb. 18, 1902.
H. W. A. FETTE.
GROOVE CUTTER.
(Application filed July 8, 1901.)
(Model.)

Witnesses:
William Schulz.
Edward Ray.

Inventor:
Heinrich Wilhelm Adolf Fette
by his attorneys
Roeder & Briesen

THE NORRIS PETERS CO., PHOTO-LITHO., WASHINGTON, D. C.

UNITED STATES PATENT OFFICE.

HEINRICH WILHELM ADOLF FETTE, OF ALTONA-OTTENSEN, GERMANY.

GROOVE-CUTTER.

SPECIFICATION forming part of Letters Patent No. 693,508, dated February 18, 1902.

Application filed July 8, 1901. Serial No. 67,387. (Model.)

*To all whom it may concern:*

Be it known that I, HEINRICH WILHELM ADOLF FETTE, a citizen of the German Empire, and a resident of Altona-Ottensen, Germany, have invented certain new and useful Improvements in Groove-Cutters, of which the following is a specification.

This invention relates to an improved tool for cutting grooves into metallic work-pieces. It consists in the features of construction fully pointed out in the claims.

Figure 1:
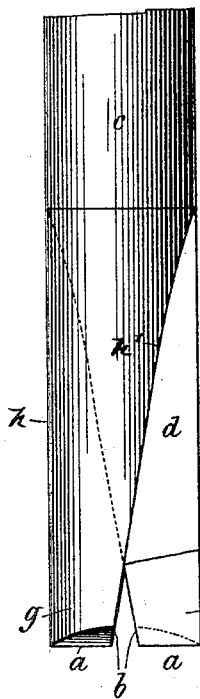
Figure 3:
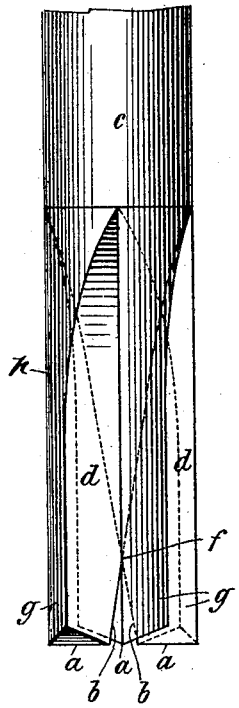
Figure 5:
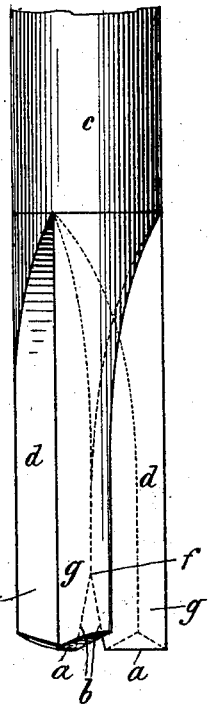
Figure 2:
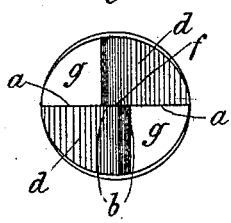
Figure 4:
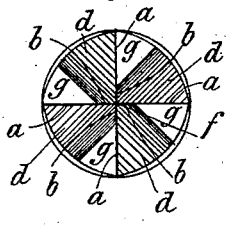
Figure 6:
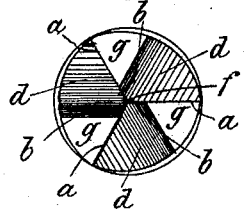

In the accompanying drawings, Figures 1 and 2 represent a cutter with two angular edges. Figs. 3 and 4 show a cutter with four angular edges; and Figs. 5 and 6 represent a cutter with three angular edges, Figs. 1, 3, and 5 being side elevations and Figs. 2, 4, and 6 end elevations.

The letter $c$ represents the body of the groove-cutter, the working end of which is divided into longitudinal arms $g$ by means of intervening longitudinal grooves $d$. One edge $h$ of each arm is straight or parallel to the axis of the tool and constitutes a cutting edge. The other edge $h'$ of each arm is curved so that each groove $d$ gradually widens toward the end of the tool. This widening of the grooves is such that at the base the core is entirely removed from the tool, so that here each arm $g$ is separated at the center from the adjoining arms and is triangular in cross-section. In this way there is formed upon each arm an inner cutting edge $b$, the edges $b$ of the several arms meeting at an apex $f$. Each arm $g$ is backed off at its periphery, and the base of each arm is also backed off to form a third cutting edge $a$, the cutting edges $h$, $b$, and $a$ for each arm being all arranged in one and the same plane. When I use cutters with two arms, the grooves form at $f$ perfect sectors of about ninety degrees, with four arms about forty-five degrees, and with three arms about sixty degrees.

The operation is as follows: The tool is secured to the spindle of a boring-bench, cutting-machine, or lathe and is rotated. It is first bored into the work-piece at right angles to the groove to be cut, such boring operation being effected by the cutting edges $a$ and $b$. After the tool has been sunk into the work-piece to a depth equal to the height of the groove desired the work-piece is fed at right angles to the axis of the tool. During this operation the groove will be cut by the axially-extending cutting edges $h$ of the rotating tool.

I claim—

1. A groove-cutter provided with a number of longitudinally-extending arms, and intervening grooves, the arms being separated from each other at their ends and provided with three cutting edges, substantially as specified.

2. A groove-cutter provided with a number of longitudinally-extending arms having one straight edge and one curved edge to form intervening grooves, the ends of the arms being separated from each other to form an inner cutting edge upon each arm, substantially as specified.

Signed by me at Hamburg this 22d day of June, 1901.

HEINRICH WILHELM ADOLF FETTE.

Witnesses:
   F. POTHS,
   E. H. L. MUMMENHOFF.